Dec. 29, 1970  J. CHASS  3,551,866

ROTARY VARIABLE DIFFERENTIAL TRANSFORMER

Filed July 3, 1969  3 Sheets-Sheet 1

INVENTOR
JACOB CHASS
BY
ATTORNEYS

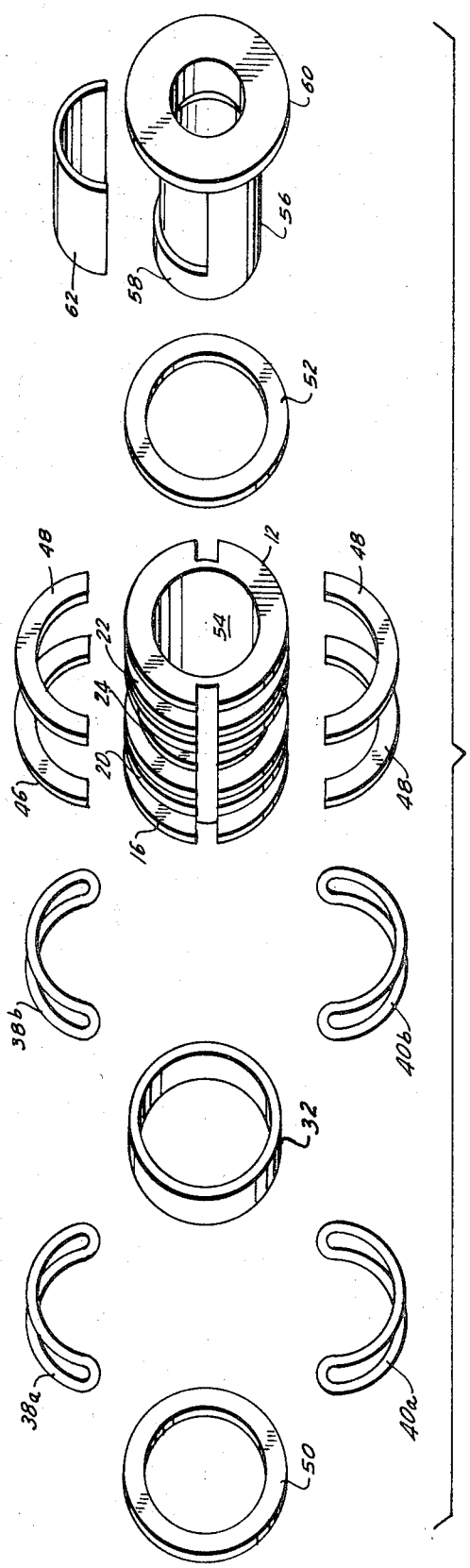

United States Patent Office 3,551,866
Patented Dec. 29, 1970

3,551,866
ROTARY VARIABLE DIFFERENTIAL
TRANSFORMER
Jacob Chass, Forest Hills, N.Y., assignor to Pickering & Company, Inc., Plainview, N.Y., a corporation of New York
Filed July 3, 1969, Ser. No. 838,836
Int. Cl. H01f 21/06
U.S. Cl. 336—132      5 Claims

ABSTRACT OF THE DISCLOSURE

A rotary variable differential transformer having a wide angle linear output range is provided. The transformer includes two secondary windings connected in bucking series and disposed on diametrically opposed sides of a core contained within an incomplete magnetic circuit and a magnetic rotor adapted to complete a portion of the magnetic circuit about all or a part of one or both secondary windings.

BACKGROUND OF THE INVENTION

Differential transformers of the type composed of primary and secondary coils and a movable member, the position of which determines the secondary voltage for a given primary voltage are well known. In transformers of this type, secondary windings as well as primary windings are frequently connected in series opposition relationship as well as in series aiding relationship. By series opposition relationship, it is meant that the coils are connected so that the voltages are in opposite phase. By series aiding relationship it is meant that the voltages in the coils are of the same phase. When there is a minimum or substantially zero voltage output of the secondary coils, it is said that the null position has been achieved. When the voltage output of the secondary coils is related to the angular position of a rotatable member such as a rotor, the device is referred to as a rotary variable differential transformer.

There are many types of rotary variable differential transformers having great utility. However, there has been a need for a small, relatively high power output rotary variable differential transformer having an output voltage that is a linear function of the displacement of the rotor from a null position.

SUMMARY OF THE INVENTION

It is, therefore, a principal object of the present invention to provide a rotary variable differential transformer wherein the output voltage of the secondary is linear over a wide angle of rotation of the rotor from a null position.

Further objects are to provide such a transformer having a high degree of sensitivity, a high output, having no wiper or moving contacts, and which may be hermetically contained.

These and other objects and advantages are attained in accordance with the present invention with a differential transformer comprising a housing containing therein an elongated tubular core member of nonmagnetic material, which is fixed relative to the housing. Magnetic circuit elements are provided within the housing including a pair of longitudinal spaced end coupling elements disposed circumferentially about the core and a pair of magnetic members spaced radially apart from one another extending between said coupling elements. One of the magnetic members is fixed with respect to the core and extends completely about the core. The other member is rotatable with respect to the core and extends arcuately about the core for approximately 180° of arc. A primary winding of electrically conductive material is wound about the core disposed between the coupling elements and also disposed between the magnetic members. A first secondary winding and a second secondary winding each comprising first and second coils connected together in a series aiding relationship are disposed in side by side alignment along the core between the magnetic members. The coils of each winding are wound about one of the magnetic coupling elements and extend arcuately about the same side of the core for substantially 180°. The secondary windings are disposed on opposite sides of the core and are connected to each other in bucking series or series opposition relationship.

The voltage induced in the secondary windings is determined by the total number of lines of flux cut by each of the secondary windings when the primary winding is connected to an alternating current source. The number of lines of flux cut by each winding is related directly to the area of the magnetic circuit contained within the zone defined by each winding (that is, each zone extends arcuately about the core for 180° of arc) and this area in turn is related directly to the angular position of the rotatable magnetic member. Thus, the secondary voltage will vary linearly with the angular displacement of the rotatable member and the aforementioned objective will be attained.

BRIEF DESCRIPTION OF THE DRAWINGS

In the accompanying drawings:
FIG. 6 is an exploded perspective view of the differential transformer of the present invention removed from its housing;
FIG. 7 is an electrical schematic illustrating the relationship of the primary and secondary windings;
and
FIG. 8 including 8a and 8b is a voltage-displacement chart illustrating the output voltage as a function of angular displacement for alternate secondary windings wherein the total number of turns of the first and second secondary windings are respectively equal and unequal.

DETAILED DESCRIPTION OF THE PREFERRED EMBODIMENT

Figure 1:
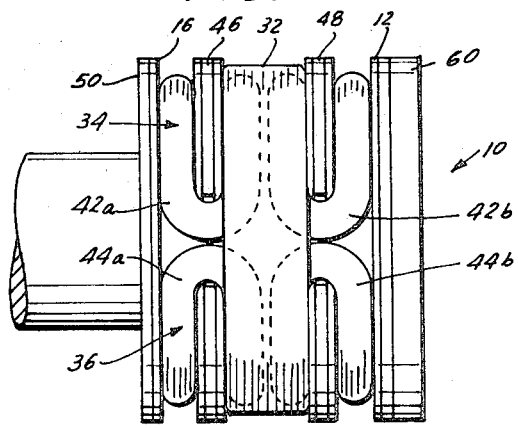
FIG. 1 is a fragmentary side elevational view of the differential transformer of the present invention with the associated housing removed.
Figure 2:
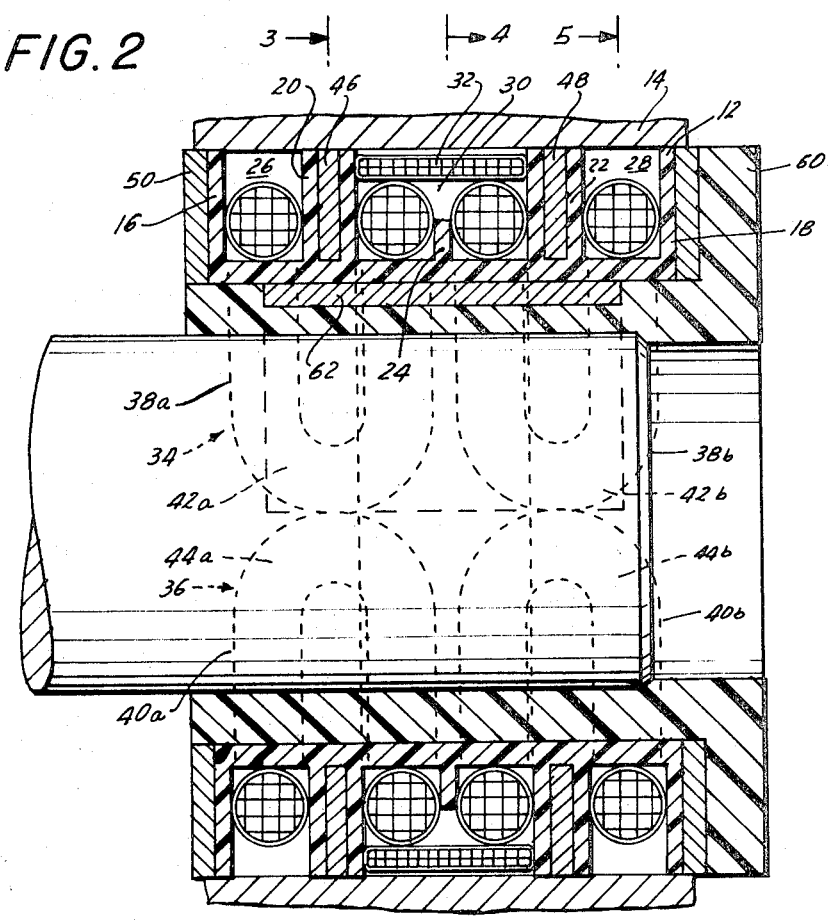
FIG. 2 is a fragmentary side elevational sectional view of the differential transformer.
Figure 3:
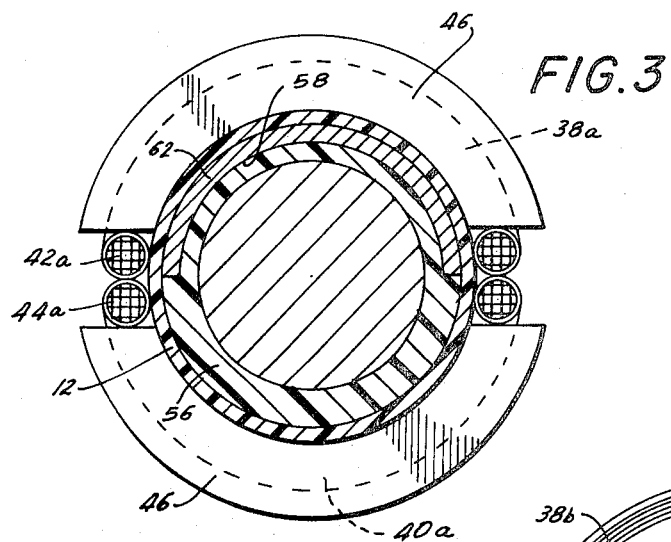
FIG. 3 is a sectional view taken along reference lines 3—3 of FIG. 2 in the direction of the arrows.
Figure 4:
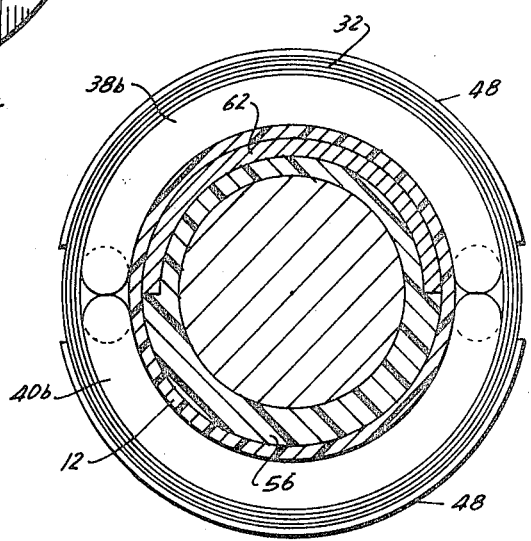
FIG. 4 is a sectional view taken along reference lines 4—4 of FIG. 2 in the direction of the arrows.
Figure 5:
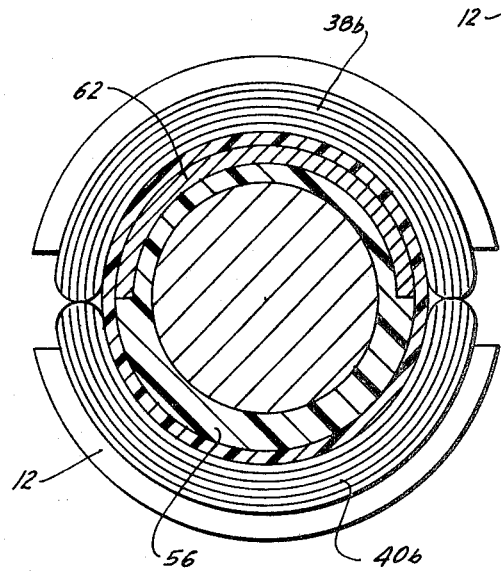
FIG. 5 is a sectional view taken along reference lines 5—5 of FIG. 2 in the direction of the arrows.

The present invention is illustrated in the accompanying drawings wherein similar components bear the identical reference numeral throughout the several views. Reference is now made to the drawings and to FIGS. 1 through 6 in particular wherein the differential transformer 10 of the present invention is illustrated as including a hollow core member 12 formed of a nonmagnetic material and serving as a bobbin for the various windings to be described forthwith. The core 12 is contained within a housing 14 shown in section in FIG. 2. The housing, if desired, may be hermetically sealed after the core has been positioned therein. A plurality of flanges extend radially outwardly from the outer surface of core 12 including end flanges 16 and 18, two pairs of intermediate flanges 20 and 22, and center flange 24. The flanges, with the exception of center flange 24, extend outwardly for the same distance. Center flange 24 is somewhat shorter than the other flanges. The flanges serve to divide the outer surface area of core 12 into outer compartments 26 and 28 and inner compartment 30.

The core 12 supports several coils of insulated, electrically conductive wire, wound completely or partially therearound and disposed within compartments 26, 28, and 30. In this connection, a primary winding 32 is contained within inner compartment 30 and consists of a helical coil of wire wound completely about the core. Two secondary windings 34 and 36 are provided, each comprising two identical coils, 38a and 38b and 40a and 40b, wound respectively about the pairs of intermediate flanges 20 and 22. The secondary windings 34 and 36 are connected to one another in bucking series relationship and the coils forming each of the secondary windings are connected in series aiding relationship as shown schematically in FIG. 7. Each coil of both of the secondary windings extends arcuately about the core for approximately 180° of arc. The two coils 38a and 38b of secondary winding 34 are aligned in side by side relationship with each other on the same side of core 12 as are coils 40a and 40b of secondary winding 36. The coils of winding 34 are diametrically opposed to the coils comprising the other winding. To accommodate the closed ends 42a and 44a of coils 38a and 40a respectively, suitable openings are provided in the intermediate pair of flanges 20. Similar openings are provided in the pair of flanges 22 to accommodate the closed ends 42b and 44b of coils 38b and 40b, respectively.

Magnetic elements 46 and 48, formed of ferromagnetic material, are disposed between the two flanges comprising each intermediate flange pair 20 and 22. The magnetic elements comprise substantially semicircular members adapted to fit between the flanges of each intermediate pair with sufficient space between complementary halves to enable the secondary coils to wrap around their associated flange pairs. Magnetic end plates 50 and 52 are provided outside end flanges 16 and 18, respectively. As was previously stated, core 12 and its associated windings and magnetic elements are contained within housing 14. The inner surface of housing 14 is formed of a suitable ferromagnetic material.

A longitudinal bore 54 extends through core 12 and shaft 56 is provided within bore 54 concentric with core 12 and free to rotate with respect to the core. In this connection, any means for rotatably supporting shaft 56 may be utilized, such as using a portion of the core as a sleeve bearing or by providing bearings for the shaft. Also, a suitable thrust bearing may be utilized. Shaft 56 is formed of a nonmagnetic, nonconductive material and includes a cutout section 58 disposed upon the outer surface thereof extending longitudinally for a distance equal to the distance between the midpoints of outer compartments 26 and 28 of core 12 and arcuately about shaft 56 for 180° of arc. A flange 60 is provided at one end of shaft 56 and serves to align shaft 56 within bore 54 with cutout 58 extending between the midpoints of compartments 26 and 28. A saddle-shaped ferromagnetic rotor 62 is provided seated within cutout 58 and extending both arcuately and longitudinally over the entire cutout. The thickness of rotor 62 is substantially equal to that of the depth of cutout 58 enabling magnetic number 62 to seat flush against the inner surface of core 12 when the shaft is positioned within the bore. Flange 60 extends beyond an open end of housing 14 and hence serves as a knob which, when rotated, will cause an identical rotation of rotor 62.

Thus, as shaft 60 is rotated with respect to core 12, the position of the magnetic circuit comprising the housing, magnetic elements 46 and 58, and magnetic rotor 62 will correspondingly rotate, causing variations in the number of lines of flux within the zones defined by the first and second secondary windings 34 and 36 and hence cut by the secondary windings. The total output of the secondary windings will thus vary directly with the area of the rotor within each zone and hence will vary linearly with the rotation of the shaft relative to the core since this will determine the number of lines of flux cut by each coil.

The number of turns of each coil of the same winding that is 38a and 38b and 40a and 40b are necessarily equal. If the total number of turns of both windings are also equal, then the secondary output voltage will vary in accordance with FIG. 8a, reaching a maximum value in one direction when rotor 62 is positioned entirely within one zone, a maximum value in the opposite direction when the rotor is entirely within the other zone, and null positions when equal portions of the rotor are in both zones, If the two secondary windings are not equal, with the number of turns of one winding greatly exceeding the number of turns of the other winding, the output voltage of the transformer will vary in accordance with FIG. 8b. In this connection, the voltage will reach a maximum when the lines of flux are cut completely by one winding and a minimum when the magnetic member approaches but does not entirely extend across the other winding.

Having thus described the invention, what is claimed is:

1. A differential transformer comprising a housing; an elongated tubular core of nonmagnetic material disposed within said housing and fixed relative to said housing; a magnetic circuit generating lines of flux perpendicular to the longitudinal axis of said core including a pair of longitudinally spaced apart coupling elements disposed about said core and a pair of magnetic members spaced radially apart from one another extending between said coupling elements, one of said members being fixed with respect to said core and extending completely about said core and the other member being rotatable with respect to said core and extending arcuately about said core; a primary winding of electrically conductive wire wound about said core disposed between said coupling elements and also disposed between said magnetic members; a first secondary winding comprising first and second coils connected together in series aiding relationship disposed in side by side alignment along said core between said magnetic members, said coils each being wound about one of said coupling elements and extending arcuately about said core; a second secondary winding comprising first and second coils connected together in series aiding relationship and disposed in side by side alignment along said core between said magnetic members, said coils each being wound about one of said coupling elements, extending arcuately about said core, and positioned diametrically opposite to said first secondary winding coils; and said first secondary winding being connected to said second secondary winding in series opposition relationship.

2. The invention in accordance with claim 1 wherein said other magnetic member, said first secondary winding coils and said second secondary winding coils each extend arcuately about said core for substantially 180° of arc.

3. The invention in accordance with claim 2 wherein one of said magnetic members comprises said housing; the other magnetic member comprises a rotor disposed within said housing concentric with said core and rotatable thereabout; and further comprising turning means coupled to said rotor and extending outwardly beyond said housing whereby rotation of said turning means produces rotation of said rotor relative to said housing.

4. The invention in accordance with claim 1 wherein said first and second secondary windings each consists of an equal plurality of turns.

5. The invention in accordance with claim 1 wherein the number of turns of said first secondary winding exceeds the number of turns of said second secondary winding.

References Cited
UNITED STATES PATENTS

| | | | |
|---|---|---|---|
| 2,461,685 | 2/1949 | Godsey | 336—135X |
| 2,756,357 | 7/1956 | Schaberg | 336—135X |
| 3,394,363 | 7/1968 | Norman | 336—135X |

THOMAS J. KOZMA, Primary Examiner

U.S. Cl. X.R.

336—135, 208